US010332416B2

(12) United States Patent
Deane et al.

(10) Patent No.: US 10,332,416 B2
(45) Date of Patent: Jun. 25, 2019

(54) AUTOMATED TEST ITEM GENERATION SYSTEM AND METHOD

(75) Inventors: Paul Deane, Lawrenceville, NJ (US); Derrick Higgins, Highland Park, NJ (US)

(73) Assignee: Educational Testing Service, Princeton, NJ (US)

(*) Notice: Subject to any disclaimer, the term of this patent is extended or adjusted under 35 U.S.C. 154(b) by 2627 days.

(21) Appl. No.: 10/822,426

(22) Filed: Apr. 12, 2004

(65) Prior Publication Data
US 2004/0253569 A1 Dec. 16, 2004

Related U.S. Application Data

(60) Provisional application No. 60/461,896, filed on Apr. 10, 2003.

(51) Int. Cl.
| G09B 7/00 | (2006.01) |
| G09B 23/02 | (2006.01) |
| G09B 23/04 | (2006.01) |
| G09B 19/02 | (2006.01) |
| G09B 17/00 | (2006.01) |

(52) U.S. Cl.
CPC ........... G09B 17/00 (2013.01); G09B 7/00 (2013.01); G09B 19/02 (2013.01); G09B 23/02 (2013.01); G09B 23/04 (2013.01)

(58) Field of Classification Search
USPC ....... 434/188, 191, 201, 211, 362, 322, 323, 434/350
See application file for complete search history.

(56) References Cited

U.S. PATENT DOCUMENTS

| 4,887,212 A | * | 12/1989 | Zamora et al. ............... 704/8 |
| 5,428,712 A | * | 6/1995 | Elad et al. ................. 706/46 |
| 5,581,663 A | * | 12/1996 | Zlotin et al. ............... 706/46 |
| 5,584,699 A | * | 12/1996 | Silver ....................... 434/201 |
| 5,597,312 A | * | 1/1997 | Bloom et al. .............. 434/362 |
| 5,657,256 A | * | 8/1997 | Swanson et al. .......... 702/119 |
| 5,677,835 A | * | 10/1997 | Carbonell et al. ........... 704/8 |
| 5,836,771 A | * | 11/1998 | Ho et al. ................... 434/362 |
| 5,890,911 A | * | 4/1999 | Griswold et al. .......... 434/322 |

(Continued)

OTHER PUBLICATIONS

Asahara, M. et al., 2000, *Extended Models and Tools for High-Performance Part-of-Speech Tagger, in Proceedings of the COLING-ACL*, pp. 21-27, Saarbruecken, Germany, Association for Computational Linguistics.

(Continued)

*Primary Examiner* — Michael C Grant
(74) *Attorney, Agent, or Firm* — Jones Day

(57) ABSTRACT

A method and system for using a natural language generator for automatic assessment item generation is disclosed. The natural language generator includes a document structure generator that produces an abstract document specification defining a structure for an assessment item based on user input. The abstract document specification is input into a logical schema generator, which produces a logical schema specification that creates a more detailed specification for an assessment item. Finally, a sentence generator receives the logical schema specification and creates natural language for the assessment item based on the variables defined in the logical schema specification.

32 Claims, 6 Drawing Sheets

(56) References Cited

U.S. PATENT DOCUMENTS

| | | | |
|---|---|---|---|
| 5,893,717 A * | 4/1999 | Kirsch et al. | 434/118 |
| 5,902,114 A * | 5/1999 | Erickson | 434/188 |
| 6,000,945 A * | 12/1999 | Sanchez-Lazer et al. | 434/322 |
| 6,018,617 A * | 1/2000 | Sweitzer et al. | 358/1.15 |
| 6,101,490 A * | 8/2000 | Hatton | 706/55 |
| 6,112,049 A * | 8/2000 | Sonnenfeld | 434/350 |
| 6,112,051 A * | 8/2000 | De Almeida | 434/362 |
| 6,144,838 A * | 11/2000 | Sheehan | 434/362 |
| 6,259,890 B1 | 7/2001 | Driscoll et al. | |
| 6,315,572 B1 * | 11/2001 | Owens et al. | 434/322 |
| 6,341,959 B1 * | 1/2002 | Wen et al. | 434/169 |
| 6,413,100 B1 * | 7/2002 | Dickmeyer et al. | 434/322 |
| 6,442,370 B1 * | 8/2002 | Driscoll et al. | 434/350 |
| 6,484,010 B1 * | 11/2002 | Sheehan | 434/362 |
| 6,743,024 B1 * | 6/2004 | Ivler et al. | 434/322 |
| 7,165,012 B2 * | 1/2007 | Swanson | 702/182 |
| 7,466,958 B2 * | 12/2008 | Dunk et al. | 434/362 |
| 7,536,273 B2 * | 5/2009 | Swanson | 702/182 |
| 7,711,312 B2 * | 5/2010 | Higgins et al. | 434/353 |
| 8,027,806 B2 * | 9/2011 | Swanson | 702/182 |
| 8,202,097 B1 * | 6/2012 | Brittingham et al. | 434/322 |
| 8,706,022 B2 * | 4/2014 | Dunk et al. | 434/353 |
| 2002/0184265 A1 * | 12/2002 | Gupta | 707/513 |
| 2003/0113699 A1 * | 6/2003 | Johnson et al. | 434/323 |
| 2006/0161371 A1 * | 7/2006 | Swanson | 702/123 |
| 2006/0172276 A1 * | 8/2006 | Higgins et al. | 434/362 |
| 2009/0024934 A1 * | 1/2009 | Dunk et al. | 715/753 |
| 2009/0233262 A1 * | 9/2009 | Swanson | 434/322 |
| 2013/0179153 A1 * | 7/2013 | Israel et al. | 704/9 |

OTHER PUBLICATIONS

Baker, C.F. et al., 1998, *The Berkeley FrameNet Project*, in Proceedings of the COLING-ACL, Montreal, Canada, Association for Computational Linguistics.

Bejar, I.I. et al., 2002; *Multilingual item modeling as a mechanism for test adaptation: Applications to open ended and discrete items*. In Symposium (D. Bartram, chair), Item & Test Generation.

Bejar, I.I. et al., 2002, *A Feasibility Study of On-the-Fly Item Generation in Adaptive Testing*, ETS Research Report RR-02-23.

Chomsky, N., 1981, *Lectures on Government and Binding*, Foris, Dordrecht.

Fillmore, C.K., Jun. 2001, *Frame Semantics for Text Understanding*. In Proceedings of WorldNet and Other Lexical Resources Workshop, NAACL, Pittsburgh.

Hambleton, R.K. et al., 1999, *Increasing the validity of adapted tests: Myths to be avoided and guidelines for improving test adaptation practice*, Journal of Applied Testing Technology, vol. 1, pp. 1-12.

Laduca, A. et al., 1986, *Item modeling procedure for constructing content-equivalent multiple-choice questions*. Medical Education, 20(1), 53-56.

Matsumoto, Y.A. et al., 1999, *Japanese morphological analysis system ChaSen version 2.0 manual 2$^{nd}$ edition*, Technical Report NAIST-IS-TR99009, NAIST.

McCawley, J., 1998, *The SyntacticPhenomena of English*, Second Edition, University of Chicago Press, Chicago.

Irvine, S.H. et al. (Eds.), 2001, *Item Generation for test development*, Mahwah NJ, Lawrence Earlbaum Associates, Inc.

Matsumoto, Y. et al., 2000, *Morphological Analysis System ChaSen version 2.2.1 Manual*, Nara Institute of Science & Technology.

Singley, M.K., et al., 2002, *Item generation and beyond: applications of schema theory to mathematics assessment*, In S. Irvine & P. Kyllonen (eds.), Item Generational for Test Development, Mahway, NJ, Lawrence Erlbaum Associates.

Sireci, S.G., 2000, *Using bilingual respondents to evaluate translated-adapted items*, Applied Measurement in Education, vol. 13, No. 3, pp. 229-248.

Stansfield, C.W., 2003, *Test translation and adaptation in public education in the USA*, Language Testing vol. 20, No. 2, pp. 189-207.

Beale, S., et al., *De-Constraining Text Generation*, In Proceedings of the Ninth International Workshop on Natural Language Generation, 1998, 10 pages.

Bejar, I. I., *A Generative Approach to the Development of Hidden Figure Items*, Research Report No. RR-86-20-ONR, Jun. 1986, 43 pages, Office of Naval Research.

Bejar, I. I., *A Generative Approach to Psychological and Educational Measurement*, in Test Theory for a New Generation of Tests, Frederickson, Misley and Bejar (Eds.), 1993, pp. 323-359.

Bejar, I. I., *Generative Response Modeling: Leveraging the Computer as a Test Delivery Medium*, Research Report No. ETS-RR-96-13, Apr. 1996, 44 pages, Educational Testing Service.

Bejar, I. I., *Generative Testing: From Conception to Implementation*, in Item Generation for Test Development, Irvine and Kyllonen (Eds.), 2002, pp. 199-208.

Bejar, I., et al., *A Generative Approach to the Modeling of Isomorphic Hidden-Figure Items*, Applied Psychological Measurement, Jun. 1991, vol. 15, No. 2, pp. 129-137.

Bennett, R.E., *An Electronic Infrastructure for a Future Generation of Tests*, in Technology Applications in Education: A Learning View, O'Neil and Perez (Eds.), 2003, pp. 267-281.

Brown, J.S., et al., *Diagnostic Models for Procedural Bugs in Basic Mathematical Skills*, Cognitive Science, vol. 2, 1978, pp. 155-192.

Cahill, L., et al., *In Search of a Reference Architecture for NLG Systems*, Information Technology Research Institute Technical Report No. ITRI-99-23, Dec. 1999, 10 pages.

Cahill, L., et al., *Component Tasks in Applied NLG Systems*, Information Technology Research Institute Technical Report No. ITRI-99-05, Mar. 1999, 25 pages.

Dennis, I., et al., *Approaches to Modeling Item-Generative Tests*, in Item Generation for Test Development, Irvine and Kyllonen (Eds.), 2002, pp. 53-71.

Embretson, S.E., *Psychometric Models for Learning and Cognitive Processes*, in Test Theory for a New Generation of Tests, Frederickson, Misley and Bejar (Eds.), 1993, pp. 125-150.

Embretson, S.E., *A Cognitive Design System Approach to Generating Valid Tests: Application to Abstract Reasoning*, Psychological Methods, vol. 3, 1998, pp. 380-396.

Embretson, S.E., *Generating Items During Testing: Psychometric Issues and Models*, Psychometrika, vol. 64, Dec. 1999, pp. 407-433.

Embretson, S.E., *Generating Abstract Reasoning Items with Cognitive Theory*, in Item Generation for Test Development, Irvine and Kyllonen (Eds.), 2002, pp. 219-250.

Enright, M.K., et al. *Items by Design: The Impact of Systematic Feature Variation on Item Statistical Characteristics*, GRE Board Research Report No. 99-15-R, Sep. 1999, 38 pages.

Enright, M.K., et al., *Modeling the Difficulty of Quantitative Reasoning Items: Implications for Item Generation*, in Item Generation for Test Development, Irvine and Kyllonen (Eds.), 2002, pp. 129-157.

Fillmore, C.J., *The Case for Case*, in Universals in Linguistic Theory, Bach and Harms (Eds.), 1968, pp. 1-88.

Fillmore, C.J., *Frame Semantics and the Nature of Language*, in Annals of the New York Academy of Sciences: Conference on the Origin and Development of Language and Speech, 1976, vol. 280, pp. 20-32.

Fillmore, C.J., *Scenes-and-Frames Semantics*, in Fundamental Studies in Computer Science, Zampolli (Ed.), vol. No. 59, 1977, pp. 55-81.

Fillmore, C.J., *The Need for a Frame Semantics Within Linguistics*, Statistical Methods in Linguistics, vol. 12, 1976, pp. 5-29.

Fillmore, C.J., *Frame Semantics*, in Linguistics in the Morning Calm, The Linguistic Society of Korea (Ed.), 1982, pp. 111-137.

Fillmore, C.J., *Frames and the Semantics of Understanding*, Quaderni di Semantica, 1985, vol. 6, No. 2, pp. 222-254.

Fillmore, C.J., et al., *Starting Where the Dictionaries Stop: The Challenge of Corpus Lexicography*, in Computational Approaches to the Lexicon, Atkins and Zampolli (Eds.), 1994, pp. 349-393.

Mental Models, Gentner and Stevens (Eds.), Lawrence Erlbaum Associates, (Table of Contents), 1983, 5 pages.

Gildea, D., et al., *Automatic Labeling of Semantic Roles*, Computational Linguistics, 2002, vol. 28, No. 3, 54 pages.

(56) References Cited

OTHER PUBLICATIONS

Task Variables in Mathematical Problem Solving, Goldin and McClintock (Eds.), Franklin Institute Press, (Table of Contents), 1984, 6 pages.

Hall, R., et al., *Exploring the Episodic Structure of Algebra Story Problem Solving*, Cognition and Instruction, 1989, vol. 6, No. 3, pp. 223-283.

Hinsley, D.A., et al., *From Words to Equations Meaning and Representation in Algebra Word Problems*, in Cognitive Processes in Comprehension, Lawrence Erlbaum Associates, 1977, pp. 89-96.

Hively, II, W., et al., A *"Universe-Defined" System of Arithmetic Achievement Tests*, Journal of Educational Measurement, 1968, vol. 5, No. 4, pp. 275-290.

Hombo, C.M., et al., *A Simulation Study of the Impact of Automatic Item Generation under NAEP-Like Data Conditions*, presented at the Annual Meeting of the National Council on Measurement, Apr. 2001, 40 pages.

Irvine, S.H., et al., *Towards a Theory of Algorithm-Determined Cognitive Test Construction*, British Journal of Psychology, 1990, vol. 81, pp. 173-195.

Item Generation for Test Development, Irvine and Kyllonen (Eds.), Lawrence Erlbaum Associates, (Table of Contents), 2002, 5 pages.

Johnson-Laird, P.N., Mental Models, Cognitive Science Series, (Table of Contents), 1983, 2 pages.

Johnson, C.R., et al., *The FrameNet Tagset for Frame-Semantic and Syntactic Coding of Predicate-Argument Structure*, Proceedings of the 1$^{st}$ Meeting of the North American Chapter of the Association for Computational Linguistics (ANLP-NAACL 2000), 2000, pp. 56-62.

Kyllonen, P., *Item Generation for Repeated Testing of Human Performance*, in Item Generation for Test Development, Irvine and Kyllonen (Eds.), 2002, pp. 251-276.

LaDuca, A., et al., *Item Modelling Procedure for Constructing Content-Equivalent Multiple Choice Questions*, Medical Education, 1986, vol. 20, pp. 53-56.

Schemas in Problem Solving, Marshall, S.P., Cambridge University Press, (Table of Contents), 1995, 3 pages.

Mayer, R.E., *Frequency Norms and Structural Analysis of Algebra Story Problems into Families, Categories, and Templates*, Instructional Science, 1981, vol. 10, pp. 135-175.

Mayer, R.E., *Memory for Algebra Story Problems*, Journal of Educational Psychology, 1982, vol. 74, No. 2, pp. 199-216.

McArthur, D., et al., *Learning Problem-Solving Skills in Algebra*, Journal of Educational Technology Systems, 1986-1987, vol. 15, No. 3, pp. 303-324.

Meisner, R. M., et al., *The Comparability of the Statistical Characteristics of Test Items Generated by Computer Algorithms*, ACT Research Report Series No. 93-9, Dec. 1993, 28 pages.

Minsky, M., *A Framework for Representing Knowledge*, Artificial Intelligence Memo No. 306, in the Psychology of Computer Vision, McGraw-Hill, Jun. 1974, pp. 211-277.

Mislevy, R. J., et al., *On the Roles of Task Model Variables in Assessment Design*, in Item Generation for Test Development, Irvine and Kyllonen (Eds.), 2002, pp. 97-128.

Nathan, M. J., et al., *A Theory of Algebra-Word-Problem Comprehension and Its Implications for the Design of Learning Environments*, Cognition and Instruction, 1992, vol. 9, No. 4, pp. 329-389.

Newstead, S., et al., *Using the Psychology of Reasoning to Predict the Difficulty of Analytical Reasoning Problems*, in Item Generation for Test Development, Irvine and Kyllonen (Eds.), 2002, pp. 35-51.

Paige, J. M., et al., *Cognitive Processes in Solving Algebra Word Problems*, in Problem Solving: Research, Method and Theory, Kleinmutz (Ed.), 1966, pp. 51-119.

Paiva, D.S., *A Survey of Applied Natural Language Generation Systems*, Information Technology Research Institute Technical Report Series (ITRI-98-03), Jul. 1998, 56 pages.

Pianta, E., et al., *Mixing Representation Levels: The Hybrid Approach to Automatic Text Generation*, Proceedings of AISB'99 Workshop, Jul. 1999, 6 pages.

Reed, S.K., *A Structure-Mapping Model for Word Problems*, Journal of Experimental Psychology: Learning, Memory and Cognition, 1987, vol. 13, No. 1, pp. 124-139.

Reed, S.K., et. al., *Selecting Analogous Problems: Similarity Versus Inclusiveness*, Memory and Cognition, 1990, vol. 18, No. 1, pp. 83-98.

Reed, S.K., et al., *Usefulness of Analogous Solutions for Solving Algebra Word Problems*, Journal of Experimental Psychology: Learning, Memory, and Cognition, 1985, vol. 11, No. 1, pp. 106-125.

Reiter, E., *NLG vs. Templates*, Proceedings of the Fifth European Workshop on Natural Language Generation, 1995, 11 pages.

Reiter, E., et al., *Building Applied Natural Language Generation Systems*, Natural Language Engineering, vol. 3, No. 1, 1997, 32 pages.

Riley, M.S., et al., *Development of Children's Problem-Solving Ability in Arithmetic*, in the Development of Mathematical Thinking, Ginsburg (Ed.), Academic Press, Inc., 1983, pp. 153-196.

Ruppenhofer, J., et al., *Collocational Information in the FrameNet Database*, Proceedings of the Tenth Euralex International Congress, 2002, vol. 1, 11 pages.

Scripts, Plans, Goals and Understanding, An Inquiry into Human Knowledge Structure, Schank, R.C., et al., Lawrence Erlbaum Associates, (Table of Contents), 1977, 5 pages.

Sebrechts, M. M., et al., *Using Algebra Word Problems to Assess Quantitative Ability: Attributes, Strategies, and Errors*, Cognition and Instruction, 1996, vol. 14, No. 3, pp. 285-343.

Sheehan, K.M., et. al., *A Partially Automated System for Generating Passage-Based Multiple-Choice Verbal Reasoning Items*, presented at the National Council on Measurement in Education Annual Meeting, Apr. 1, 2003, 51 pages.

Silver, E.A., *Student Perceptions of Relatedness Among Mathematical Verbal Problems*, Journal for Research in Mathematics Education, May 1979, vol. 10, No. 3, pp. 195-210.

Singley, M.K., et al., *Promoting Abstract Strategies in Algebra Word Problem Solving*, Cognition Science, Proceedings of the International Conference of the Learning Sciences, Mar. 1990, 8 pages.

Sweller, J., et al., *Development of Expertise in Mathematical Problem Solving*, Journal of Experimental Psychology: General, 1983, vol. 112, No. 4, pp. 639-661.

Weaver, III, C.A., et al., *Enhancing Students' Comprehension of the Conceptual Structure of Algebra Word Problems*, Journal of Educational Psychology, 1992, vol. 84, No. 4, pp. 419-428.

Wright, D., *Scoring Tests When Items Have Been Generated*, in Item Generation for Test Development, Irvine and Kyllonen (Eds.), 2002, pp. 277-286.

U.S. Appl. No. 09/654,949, filed Sep. 1, 2000, Brittingham, et al. (unpublished application).

\* cited by examiner

Language Details

Distinct Vehicle Types: (405)
1
2

Type of Trip: (415)
- Multiple Leg
- Round Trip
- Same Distance/Route
- Same Distance
- Same Speed
- Same Time
- Same Rate/Time
- Same Rate/Distance
- Same Distance/Time
- Same Distance/Rate/Time
- Normal Name: (410)
- First Name
- Last Name
- Male First Name
- Female First Name
- Ethnic First Name 2nd Name: (410)
- First Name
- Last Name
- Male First Name
- Female First Name
- Ethnic First Name ☐ Express Route?
☐ Straight Route?
☐ Average Rate?
☐ Constant Rate?
☐ Express Endpoints?
☐ Event Nouns?
☐ Express Time by Clock?
☐ Express Rate Definition?
☐ Item Asks for Number?

☐ Narrative?
☐ Past Tense?
☐ Give Summary Info?
☐ Use Explicit Labels?

[OK] [Cancel]

FIG. 4

Math Details

First Event (505)     Key (520)

| | | |
|---|---|---|
| Minimum Rate | 50 | |
| Maximum Rate | 65 | |

Unsp / A / B / C / D

[ OK ]

[ Cancel ]

Rate Increment   1

Constants (515) ☐ Use these values

| | | | | |
|---|---|---|---|---|
| Minimum Time | 1 | Time (event 1) | 4 |
| Maximum Time | 6 | Rate (event 1) | 54 |
| Time Increment | 1 | Distance (event 1) | 216 |

Second Event (510)

| | | | | |
|---|---|---|---|---|
| Minimum Rate | 50 | Time (event 2) | 6 |
| Maximum Rate | 65 | Rate (event 2) | 62 |
| Rate Increment | 1 | Distance (event 2) | 372 |
| Minimum Time | 1 | Constant Time | 5 |
| Maximum Time | 6 | Constant Rate | 30 |
| Time Increment | 1 | Constant Distance | 50 |

FIG. 5

AUTOMATED TEST ITEM GENERATION SYSTEM AND METHOD

CLAIM OF PRIORITY

This application claims priority to U.S. provisional patent application No. 60/461,896, filed Apr. 10, 2003, entitled "Automated Test Item Generation System and Method," which is incorporated herein by reference in its entirety.

FIELD OF THE INVENTION

The present invention relates to methods and systems for generating assessment items automatically. More particularly, this invention relates to a computer system and method for providing an interface for automatically generating word problems for use in testing.

BACKGROUND OF THE INVENTION

The use of Automatic Item Generation (AIG), the practice of creating assessment items algorithmically, is of increasing interest to educational assessors. AIG permits educational assessors to quickly generate assessment items and at least partially automate the generation of such assessment items. Furthermore, assessors can provide differing assessment items, each having a similar difficulty level, to improve test security. Moreover, adaptive testing having assessment items that vary systematically in difficulty can be produced. Such advantages have encouraged the research and development of AIG technologies.

However, AIG depends upon well-founded models of the cognitive abilities underlying performance. Where such models are lacking, AIG can only have heuristic usefulness. Conventional AIG research has been performed in areas where well-founded cognitive theories support the development of AIG algorithms, such as matrix completion and analytical reasoning. Such areas are generally restricted in content and highly structured.

In contrast, progress in AIG of verbal item types has been more limited, due to the openness of content and the considerable complexity of natural language. In open-ended verbal items, a strong preference exists for developing naturalistic items based upon actually published materials, and the most productive approaches have focused upon providing techniques to support test developers by supporting more efficient item selection and evaluation.

Where constrained item types have required natural language generation, the treatment of verbal materials has been straightforward and generally uses verbal templates to generate items. Typical template-based natural language generation includes two salient properties: 1) a list of phrases or sentences with open slots; and 2) the random or pseudo-random insertion of words from predetermined lists into particular slots. Template-based generation has the advantage of being straightforward, quick and dependent upon existing items. However, AIG from such simple templates is clearly limited because natural language complexities cannot be captured within a template format. Moreover, since the strings manipulated by template-based systems have no theoretical status, they do not support any principled analysis of the language employed in any particular problem type.

Conventional template-based AIG systems suffer from four distinct limitations: maintainability, output flexibility, output quality and an inability to easily produce multilingual outputs. In a template-based system, a large number of lists are stored and manipulated in order to generate textual output because each list is task or field specific. Accordingly, repetitive lists may be required to complete populate all task sets.

In addition, as the number of templates in a template-based system grows, it is more likely that the variety of templates disguises the systematic combination of a much smaller set of variables.

Moreover, systems must resolve context-dependencies inherent in language, such as subject-verb agreement, selection restriction (i.e., one drives a car, but flies an airplane), definite-indefinite selection (i.e., a student or the student), and the like. Such dependencies are handled ad hoc in a template-based system.

Finally, in order to produce a multilingual template-based system, a system maintainer must generate new templates for target language. Moreover, dependencies between templates and dependencies between entries in templates must be redefined for each template and/or combination of entries in the target language. As such, significant effort must be expended and significant resources must be dedicated to create a multilingual template-based system.

What is needed is a method and system for improving conventional automatic item generation by using non-template-based algorithms for generating assessment item text.

A need exists for a method and system for improving the maintenance of automatic item generation systems.

A further need exists for an automatic item generation system and method that increases output variety.

A still further need exists for an automatic item generation system and method that produces higher text quality.

A further need exists for a method and system of automatic test generation that more easily permits multilingual textual output.

The present invention is directed to solving one or more of the problems described above.

SUMMARY OF THE INVENTION

A Natural Language Generation (NLG) system according to the present invention may be used to perform automatic item generation. The NLG system may use computational linguistic techniques to automate text generation. The NLG system may receive input and determine textual content from the input. The textual content may be abstractly formulated without reference to details at the level of sentences, phrases or words. One or more sentences may be planned based on the abstract content. Following this process, the exact wording for each sentence may then be formed.

Thus, a major difference between an NLG system according to the present invention and a template-based system is that the specification of textual content is separated from the details of the wording. Building an NLG system entails constructing a model specifying possible content and separating it from a model specifying how that content is most naturally expressed.

An NLG system of the present invention is more maintainable than a template-based system because a large number of lists need not be stored and manipulated in order to generate textual output. In an embodiment, the present invention separates knowledge about language in general from knowledge about specific tasks. Accordingly, the present invention is easier to maintain and modify to suit changing assessment needs and demands.

In addition, the output of the present invention may be more flexible than a template-based model. The present invention may be used to reduce variety between template-based lists in order to enable more flexible test generation.

Moreover, systems must resolve context-dependencies inherent in language, such as subject-verb agreement, selection restriction (i.e., one drives a car, but flies an airplane), definite-indefinite selection (i.e., a student or the student), and the like. Unlike a template-based system, the present invention may include modules that resolve such dependencies automatically.

Furthermore, the present invention may permit text generation in multiple languages more easily than a template-based system. In an embodiment, low-level language-specific details are segregated into language-specific modules, which permit transposition into high-level knowledge without requiring a complete system redesign. Instead, adapting an NLG system for a target language may merely require adjustment of the language-specific modules to describe a new set of linguistic, grammatical, and/or semantic rules and translation of the entries in the template.

Considerable synergy between AIG within assessment theory and NLG within computational linguistics exists. Both AIG and NLG permit automatic generation of verbal material. Moreover, the verbal material is generated in complementary ways. While AIG focuses on controlling construct-relevant content, NLG focuses on lower-level document details.

Another advantage of the present invention is the ability to distinguish between factors that significantly affect item difficulty, known as radicals, and factors that do not, known as incidentals. Conventionally, no a priori way of determining radicals and incidentals is known. In general, the determination of radicals and incidentals depends on the cognitive content of the assessment item and the task the assessment item requires respondents to perform. However, in the present invention, the vast majority of variables are incidentals, such as the particular choice of words, grammatical constructions, and phrasing details.

Verbal tasks may be separated into two types of elements: those which involve decoding (i.e., determining the meaning of text as written) and those which involve content manipulation (i.e., performing inference or other thought processes on the content after decoding). The present invention specifies how to encode what test subjects decode, so a direct relationship exists between the encoding of the present invention and decoding by a respondent. In other words, radicals generally involve content manipulation and wording typically interacts with radicals at a content level.

The present invention is directed to a method and system of generating tasks that are drawn from a constrained universe of discourse, are susceptible to formalization, require little complex inference, and for which basic verbal comprehension (decoding/encoding) is not the tested subject matter. Such tasks may include, for example, mathematical word problems. Such mathematical word problems may include distance-rate-time problems, interest rate computation problems, taxation problems, production problems, physics problems, and the like.

BRIEF DESCRIPTION OF THE DRAWINGS

Aspects, features, benefits and advantages of the embodiments of the present invention will be apparent with regard to the following description, appended claims and accompanying drawings where:

FIG. 4 depicts an exemplary detailed control screen for a distance-rate-time assessment item according to an embodiment of the present invention.

FIG. 5 depicts an exemplary task-relevant problem structure for an assessment item according to an embodiment of the present invention.

DETAILED DESCRIPTION OF THE PREFERRED EMBODIMENTS

Figure 1:
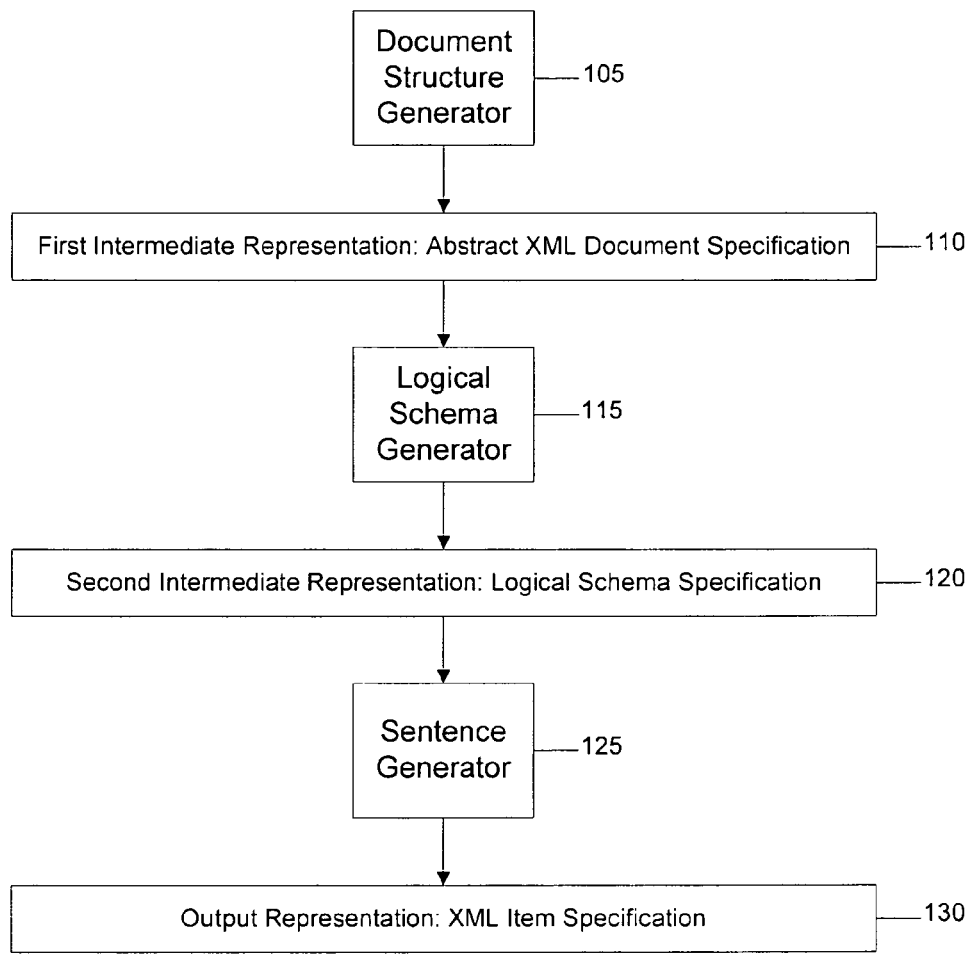
FIG. 1 depicts an exemplary high-level implementation of a system for performing natural language generation according to an embodiment of the present invention.

Before the present structures, systems and methods are described, it is to be understood that this invention is not limited to particular structures, systems, methodologies or protocols described, as these may vary. It is also to be understood that the terminology used in the description is for the purpose of describing the particular versions or embodiments only, and is not intended to limit the scope of the present invention.

It must also be noted that as used herein, the singular forms "a," "an" and "the" include plural references unless the context clearly dictates otherwise. Thus, for example, reference to a "variable" is a reference to one or more variables and equivalents thereof known to those skilled in the art, and so forth. Unless defined otherwise, all technical and scientific terms used herein have the same meanings as commonly understood by one of ordinary skill in the art. Although any methods, devices and material similar or equivalent to those described herein can be used in the practice of testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

The term "semantic frame," as used herein, refers to a method for organizing verbal content. In particular, a semantic frame makes it possible to analyze a particular type of word problem and isolate a series of variables with clear task-model relevance.

Semantic frames may be organized as a hierarchy of frames. Each semantic frame may contain linguistic detail including the schematic structure and the vocabulary associated with the particular semantic frame. Semantic frames may be used to denote particular patterns of vocabulary for certain types of assessment items that are highly systematic and have constrained vocabulary and syntax, such as mathematical word problems.

The term "schematic logical representation," as used herein, refers to information contained in a file pertaining to the syntax and vocabulary used to generate natural language for a given assessment item. A schematic logical representation may define one or more variables for which text may be generated.

Based on the semantic frame that the schematic logical representation uses, the variables for an assessment item may be limited in their vocabulary (i.e., only a limited number of word choices may be available for each variable). For instance, in a Limousine variant of a distance-rate-time semantic frame, vehicle and driver variables may be constrained to be a limousine and a chauffeur, respectively. An exemplary schematic logical representation according to an embodiment of the present invention may represent the sentence "A car drove 600 miles" logically as "VEHICLE|W TRAVEL(DISTANCE="600"|P)." In the schematic logical representation, lexical elements (VEHICLE, TRAVEL, and DISTANCE) may be represented as abstract labels, which are filled in by choosing a semantic frame and substituting appropriate lexical and grammatical materials. In addition, variables (|W and |P) and numeric values, such as the specification of distance, may permit the schematic logical representation to abstract itself from language-specific details of verbal expression while still providing a detailed specification of the content and the order in which it is to be presented. Each lexical element may represent a variable that ranges over a class of elements. The potential values for a lexical element may depend upon the selected semantic frame.

The term "mental model," as used herein, refers to a structure with a limited number of component entities and relationships, subject to direct imagination and inspection. For example, assessment items typically vary along the following dimensions (exemplary values for distance-rate-time assessment items are provided):

The number of events (one or two, typically)
The semantic frame(s) associated with each event
The primary participants in each event (variations include operator v. passenger and the type of vehicle)
The identity of the primary participants (participants may be the same or different for each event and each participant may use the same vehicle or a different vehicle)
The secondary roles relevant to each event (e.g., distance, rate, time, route followed, start point, end point, start time and end time)
The identity of the secondary roles across events (i.e., specifying relationships among events)

FIG. 1 depicts an exemplary high-level implementation of a system for performing natural language generation according to an embodiment of the present invention. In the embodiment, three primary components are identified: the document structure generator 105, the logical schema generator 115, and the sentence generator 125. The document structure generator 105 receives as input a set of abstract choices from a user interface and produces, for example, an XML document 110. The XML document 110 may represent the underlying schematic content of an assessment item that is being generated. In an embodiment, the document structure generator 105 may perform, for example, the following tasks: building a mental model, outlining a document structure which expresses the mental model in a format compatible with the task-relevant problem structure, and passing choices about low-level wording to later modules. Building a mental model may include, for example, identifying which high-level semantic frames are to be used, setting up a list of events, and binding variables across events. Outlining a document structure may include, for example, determining the number of sentences required to express different parts of the mental model, determining the function of each sentence (e.g., stating a set of facts, querying a particular variable, and the like), and determining whether information is expressed in each sentence. Passing on the choices may include, for example, packaging the information for transmission to the logical schema generator 115.

In an embodiment, the first intermediate representation 110 may be an XML document. The first intermediate representation 110 may specify the possible values for variables pertinent to the assessment item, indicate high-level items pertaining to the assessment item structure, and outline the sequence of sentences that will constitute the final assessment item. An exemplary first intermediate representation 110 is shown in Table 1.

TABLE 1

An XML Word Problem Specification

<?xml><body>
<variables>W,X,Y,Z,VONE</variables>
<frame id="1" frameID="ONE" type="DRT" VONE="VEHICLE"/>
<event id="2" frameID="ONE" eventID="A" type="DRT"
    subj="W@" rate="30" rateVar="Y" />
<event id="3" frameID="ONE" eventID="B" type="DRT"
    subj="X@" rate="70" rateVar="Z" />
<bindings id="4" frameID="ONE" type="DRT" W="VONE" X="VONE" />
<proposition id="2" frameID="ONE" eventID="A" role="QCColumnA" type="DRT"
    distance="QUERY" rate="EXPRESSED" time="UNKNOWN" />
<proposition id="F" frameID="ONE" eventID="B" role="QCColumnB" type="DRT"
    distance="QUERY" rate="EXPRESSED" time="UNKNOWN" />
</body>

The information contained in Table 1 specifies that five variables are used (i.e., W, X, Y, Z, and VONE) and that the sentences in the resulting assessment item will use vocabulary from a single semantic frame of type DRT (distance-rate-time). The variable VONE is defined to be of type VEHICLE within the semantic frame. In addition, two events are described in the document, with different rate values and different subject variables. Moreover, the resulting document includes two sentences. Each sentence queries the DISTANCE variable and provides RATE information. Neither sentence defines any information regarding TIME. Furthermore, the first sentence is placed in column A of a word problem having a Quantitative Comparison format, and the second sentence is placed in column B under the same format.

Although the content of the first intermediate representation 110 is abstract, the representation may indicate, in a concise form, the information that is to be presented and the organization of the information. The succeeding modules may define further details for the resulting assessment item.

The logical schema generator 115 may perform, for example, two discrete tasks. First, the logical schema generator 115 may structure sentences in the resulting assessment item so that the sentences are directly tied to the appropriate semantic frame. For example, for a distance-rate-time problem, the logical schema generator 115 may restructure the input from the first intermediate representation 110 so that a series of schematic statements or questions about VEHICLEs, TRAVELing, RATE, TIME and DISTANCE are produced.

In addition, the logical schema generator 115 may decide the format of the information contained in each sentence. Particularly, this may include the type of verb to use and the ordering of elements. The logical schema generator 115 may produce a predicate calculus in which the arguments are specified by the underlying mental model and in which the predicates are variables to be filled by actual natural language expressions. However, the logical schema generator 115 may not engage in fine details regarding the phrasing of each sentence. Instead, the transformation of the first intermediate representation 110 to the second intermediate representation 120 may be based on detailed information about the semantic frames relevant to each problem type. In an embodiment, the language for the assessment item is stored in the second intermediate representation 120. The second intermediate representation 120 may result in an output divided into two sections. The first section may include a series of variable definitions, which identify the classes of vocabulary to be used whenever a particular variable occurs in the text. The second section may include a logical formula using these variables, which sets up a schema or template for the resulting assessment item.

In an embodiment, the second intermediate representation 120 may be an XML document. The XML document may specify variable definitions including a series of tags for indicating how particular logical expressions map to actual vocabulary. Exemplary mappings are shown in Table 2.

TABLE 2

Logical Expression Mappings

```
<frameset id="DRT" type="9998" />
<frameset id="TEMP" type="10002" />
<vardef name="DRIVE" id="DRT" frameRole="27" />
<vardef name="VEHICLE" id="DRT" frameRole="3" />
<vardef name="TIME" id="TEMP" frameRole="2" unit="5" />
```

The definitions in Table 2 may define two semantic frames by reference to each semantic frame's location in a database containing the equivalent of a dictionary specification of all semantic frame elements. The variable DRIVE may be defined to use vocabulary from role 27 in the DRT semantic frame definition, the variable VEHICLE may be defined to use vocabulary from role 3 in the DRT semantic frame definition, and the variable TIME may be defined to use vocabulary from role 2 in the TEMP semantic frame definition. Based on these and other variable definitions, the remainder of the output may include a precise schematic specification of the content to be output. Table 3 shows a specification instance.

TABLE 3

Logical Schema Representation

```
<given>
((W and X each)|SB :: PERSON|SB
DRIVE(SEPARATE : VEHICLE|OB, SAME : DISTANCE|DI, SAME : NUMBER : TIME|TI)
</given>
<given>
PERSON|W LEAVEONE(ORIGIN|I, CLOCKTIME|M) and PERSON|W
ARRIVEONE(DESTINATION|K, CLOCKTIME|O),
DRIVEONE((VONE|Y :: VEHICLE|Y), (METER="50"|S :: DISTANCE|S), STRAIGHT :
    ROUTE|G)
</given>
<columnA>
AVERAGE : NUMBER : RATE :: PERSON|X
DRIVEONE((VONE|Z :: VEHICLE|Z), (TI|U :: TIME|U), EVENT|F :: PERSON
TRAVELONE|EVENT((DI|S :: DISTANCE|S), STRAIGHT : ROUTE|H, ORIGIN|J,
    DESTINATION|L)) RANGE(START|N, END|P)
</columnA>
<columnB>
RATE="3"
</columnB>
```

The representation in Table 3 varies from standard logical representations in order to make the translation to actual natural language text more straightforward. The translation is made more straightforward by, for example, separating the subject from the predicate; treating variables, such as |N, |S and |P, as labels attached to the elements that are verbally expressed; by treating modifiers as being attached to the argument that they modify; and the like.

The sentence generator 125 may translate the logical representations in the second intermediate representation 120 into assessment item text. The sentence generator 125 may parse the logical representations, annotate the resulting parse tree with grammatical information, find words and word forms in a dictionary based related to a selected language to fit the grammatical information and output the resulting text in order to complete the translation.

The sentence generator 125 may cover a wide range of linguistic details that are generally unrelated to the substance of the assessment item. For example, the sentence generator 125 may record the number of times an entity has been mentioned so that the choice of determiners between "a"/"an" and "the" is appropriate. Other grammatical phenomena may also be tracked, such as subject/verb agreement, preposition and case marking, and the like.

The output representation 130 may be an XML document having all text converted to the specified language. The output representation 130 may retain XML tags identifying the role that each text chunk performs in the structure of the assessment item. The output representation 130 may then be formatted for display and presented as an assessment item. The resulting assessment item may be used in connection with a test creation system.

FIGS. 2-6 depict exemplary screen shots of a graphical user interface used to generate assessment items according to an embodiment of the present invention. In the embodiment disclosed in FIGS. 2-6, a distance-rate-time assessment item is generated. Other embodiments include interest accumulation problems, tax problems, problems associated with producing items and the like. The variables used in each embodiment may be selected based on the problem type to be solved. Accordingly, the embodiment described below and in reference to FIGS. 2-6 is not meant to be limiting, but merely exemplary of the generation of one type of an assessment item.

Generation of the distance-rate-time assessment item may be sub-divided into five tasks: assigning mental model structure variables, defining identity variables in the mental model structure, determining a task-relevant problem structure, describing a document format and structure, and determining language variations.

The assignment of mental model structure variables may include defining the number of events; the number of distinct frames; the types of participants; the type of trip; the default unit of measure; and the actual distance, rate and time units used in each event. In an embodiment, a distance-rate-time problem has one or two events. Alternately, more events may be used for a distance-rate-time problem. If two or more events are used, the semantic frame for each event may differ. For example, a speed of a truck may be at issue in a first event, and a speed of a train may be at issue in a second event. Alternately, the semantic frames for each event may be the same. The type of participant may be used to specify whether people and/or vehicles are mentioned in the assessment item. If more than one event is included in the assessment item, the primary participants may include different people using the same vehicle or different vehicles, or the same person using the same vehicle or different vehicles. The trip type may be used to determine the values of one or more secondary variables. The trip type may include a round trip, a one way trip, two people or vehicles heading towards each other, two people or vehicles heading away from each other, and numerous other types of trips.

Defining the identity variables in the mental model structure may include choosing variables to express one or more of the following in each event: people, vehicles, time, distance, rate, starting locations, ending locations, starting times, ending times, the route and the event as a whole. While the distance, rate and time values are central to determination of the problem, other variables may be purely incidental to the determination of the answer to the problem.

Determination of a task-relevant problem structure may include determining which variable is being determined for each event, the answer for each event, numeric values for the mathematical variables (i.e., numeric values for distance, rate and time in each event), whether some information is provided in summary form, and whether time is expressed as a sequence of clock times. Most problems within a Transportation semantic frame may solve the equation d=rt. In such a case, the equation may map to the semantic roles Distance, Rate and Time. Another problem type that may be within a Transportation semantic frame may include a fuel efficiency problem. In such a problem, the equation to solve may be f=ed, where f is fuel consumption, e is fuel efficiency, and d is distance. If a unique answer is required for solution to an assessment item, only one variable may be unspecified. Accordingly, values may be assigned to all but one variable to provide for a unique solution. Implicit values may be assigned to complicate an assessment item. For example, the amount of time may not be explicitly specified. Rather, the assessment item may state that the person/vehicle traveled from 3:00 to 6:00.

Describing a document format and structure may include determining the format of the problem (i.e., quantitative comparison vs. problem solving) and the arrangement of content between the options and the stem. The problem format may determine the type of language used for the query of the assessment item. For example, a problem-solving (multiple choice) assessment item may query information in the form of a question: "Which of the following?" "How much?" or "How many?" In contrast, a quantitative comparison question may query information in a phrasal form: "The number of hours required . . . ," "The time taken to . . . ," "The speed at which . . . " Moreover, content may be arranged in different sections of an assessment item. For instance, in a quantitative comparison assessment item, both background information and the questions may be posed in the columns. Alternatively, background information may be posed in a question stem and the questions may be posed in the columns. Such arrangements are merely exemplary. Other embodiments may arrange information in alternate arrangements without limitation.

Determining language variations may include, for example, selecting a language, selecting a sentence structure, selecting referent identification types (identifying people by name or generically, identifying object with labels or by description), selecting detailed phrasing, determining whether quantities are in integer format, determining whether rates are identified as constant or average, and whether events are described in the present or past tense. The language may be selected based on a variable assigned by a user. In an embodiment, different data structures are stored for each language. The data structures may include, without limitation, words (in the selected language) available for use in assessment items and rules pertaining to sentence structure and grammar. The sentence structure may include an active or passive verb form. Referent identification may include calling a person in an event, for example, "Fred," "a driver," "the driver," or "driver A."

Figure 2:
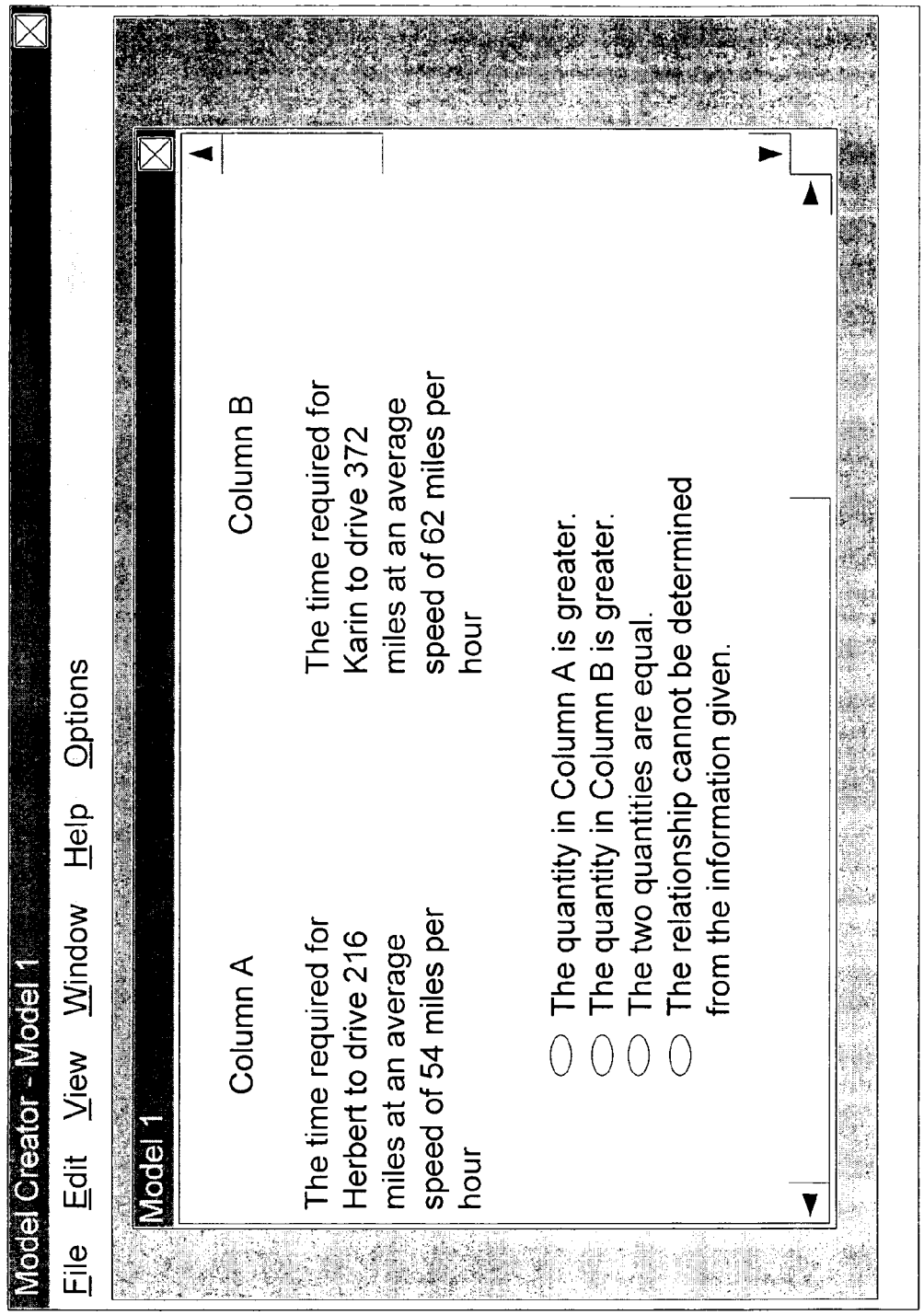
FIG. 2 depicts an exemplary screen shot of an existing word problem assessment item according to an embodiment of the present invention.

FIG. 2 depicts an exemplary screen shot of an existing word problem assessment item according to an embodiment of the present invention. The menu bar may be used to modify one or more variables for the assessment item.

Figure 3:
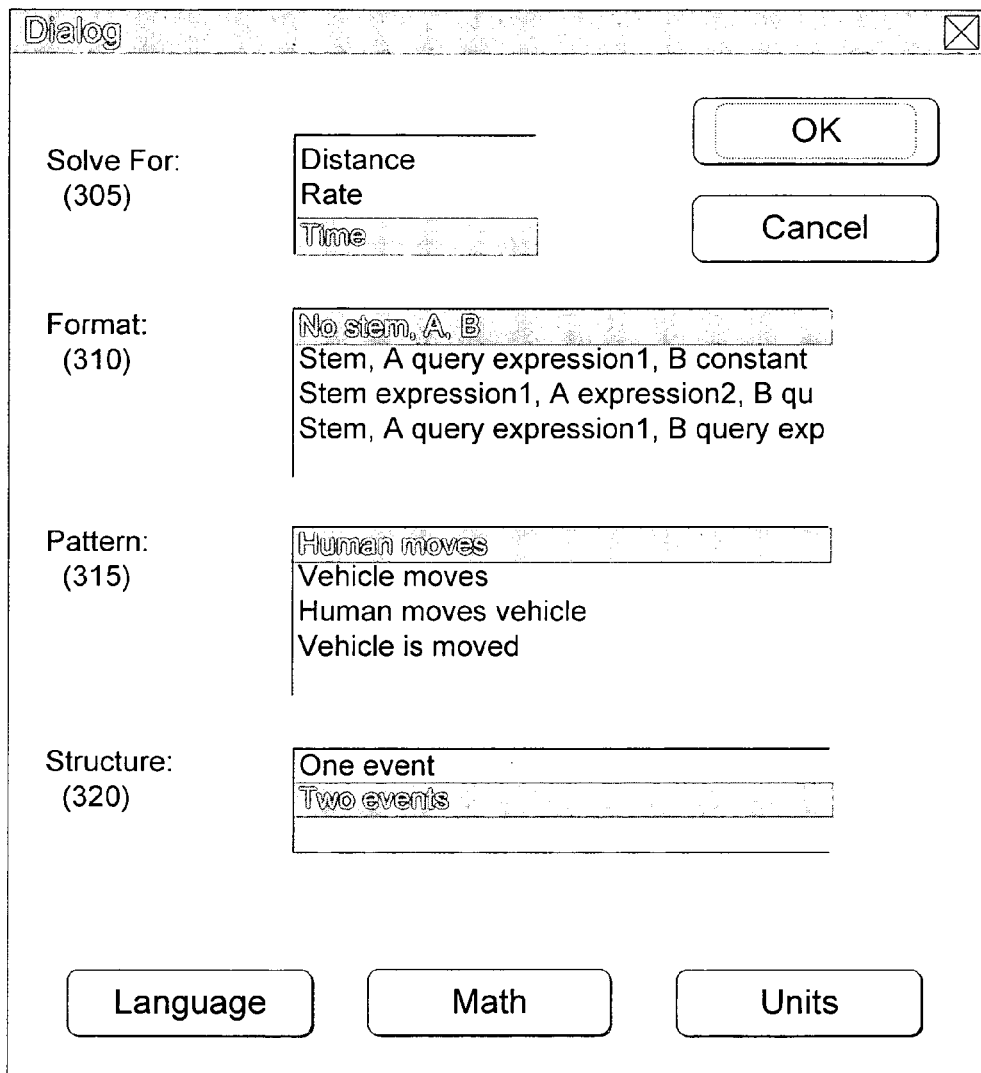
FIG. 3 depicts an exemplary variable modification screen for a distance-rate-time assessment item according to an embodiment of the present invention.

FIG. 3 depicts an exemplary variable modification screen for a distance-rate-time assessment item according to an embodiment of the present invention. In an embodiment, the variable modification screen permits a user to alter the variable for which the assessment item solves 305, the basic document format 310, the core participant type 315, and the number of events 320.

FIG. 4 depicts an exemplary detailed control screen for a distance-rate-time assessment item according to an embodiment of the present invention. In an embodiment, the detailed control screen permits a user to alter the number of distinct vehicle types 405, the name used for each person 410, the type of trip 415, and numerous other parameters pertaining to the syntactic structure and the secondary grammatical content.

FIG. 5 depicts an exemplary task-relevant problem structure for an assessment item according to an embodiment of the present invention. In an embodiment, at least one of the distance, rate and time variables 505 and 510 may be set for each event in the assessment item. If desired, the user may assign constant values 515 to the assessment item. In addition, an answer 520 to the assessment item may be supplied if desired. If an answer is supplied, values may be selected from the ranges defined for each event to ensure that the specified answer is correct for the resulting assessment item. If any value is unspecified, a random value may be selected for the variable.

Figure 6:
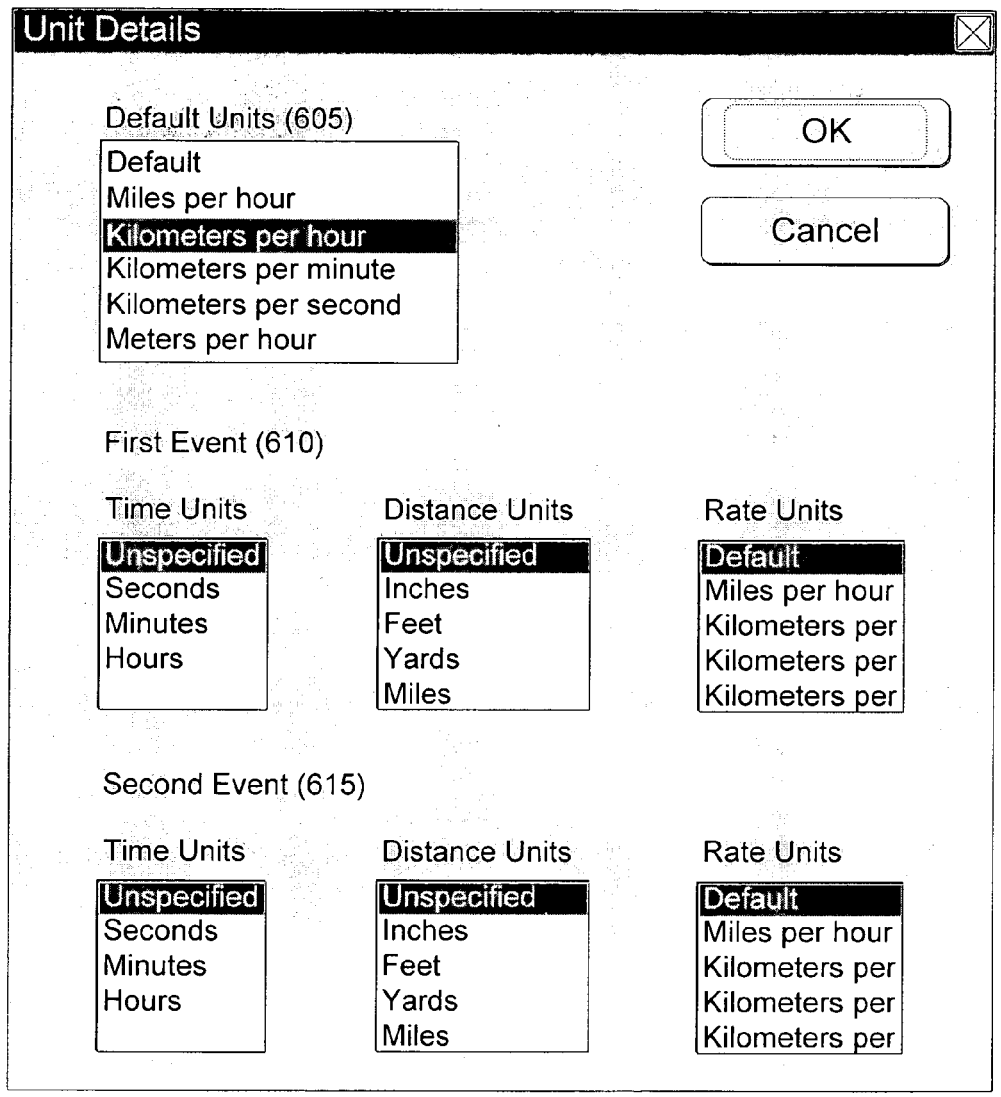
FIG. 6 depicts an exemplary measurement unit definition screen according to an embodiment of the present invention.

FIG. 6 depicts an exemplary measurement unit definition screen according to an embodiment of the present invention. Default units may be selected for one or more of a rate, a time and a distance either globally 605 or on a per event basis 610 and 615.

Using the graphical user interface described in FIGS. 2-6, new assessment item instances may be generated from an underlying model. Alternatively, parameters may be altered in an existing assessment item to generate a new assessment item.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A computer-implemented method of generating a mathematical word problem assessment item, the method comprising:
   receiving one or more word problem parameters from a user who provides input for generation of an assessment item via a graphical user interface, wherein the one or more word problem parameters are descriptive parameters upon which a content of the assessment item is based;
   identifying a plurality of number variables based on the one or more word problem parameters;
   determining a relationship between a first number variable and a second number variable of the number variables;
   generating the assessment item comprising a mathematical word problem having multiple words using a processor including automatically generating a text phrase positioned between a first numerical value corresponding to the first number variable and a second numerical value corresponding to the second number variable based on the determined relationship;
   wherein generating the text phrase comprises automatically resolving a context-dependent selection; and
   storing the assessment item in a computer-readable memory;
   wherein generating the text phrase comprises automatically choosing by the processor one or more of word order, word choice, word format, sentence structure, grammar and language of the text phrase based on the determined relationship.

2. A computer-implemented method of generating a mathematical word problem assessment item, the method comprising:
   receiving one or more inputs pertaining to the format of an assessment item, wherein the format of the assessment item comprises at least one event;
   receiving one or more word problem parameters from a user who provides input for generation of the assessment item via a graphical user interface, wherein the one or more word problem parameters are descriptive parameters upon which a content of the assessment item is based;
   identifying a plurality of number variables for use in the assessment item based on the word problem parameters, wherein each number variable is assigned to an event;
   determining a relationship between a first number variable and a second number variable assigned to an event;
   determining a format for the assessment item;
   generating the assessment item comprising a mathematical word problem having multiple words using a processor including automatically generating a text phrase positioned between a first numerical value corresponding to the first number variable and second numerical value corresponding to the second number variable based on at least the format for the assessment item and the determined relationship between number variables assigned to the at least one event;
   wherein generating the text phrase comprises automatically resolving a context-dependent selection; and
   storing the assessment item in a computer-readable memory;
   wherein generating the text phrase comprises automatically choosing by the processor one or more of word order, word choice, word format, sentence structure, grammar and language of the text phrase based on the determined relationship.

3. The method of claim 2 wherein determining a relationship for the variables assigned to each event comprises one or more of the following:
   determining a variable for which to solve for each event;
   determining an answer for each event;
   determining a value for one or more variables; and
   determining a variable format.

4. The method of claim 2 wherein determining a format for the assessment item comprises:
   determining a problem format having one or more sections; and
   determining content to place within each section.

5. The method of claim 2 wherein generating an assessment item comprises one or more of the following:
   selecting identification types for one or more of the variables; and
   determining a numerical format for each of the one or more variables.

6. The method of claim 5 wherein selecting identification types comprises at least one of:
   determining to identify a variable denoting a person generically,
   determining to identify a variable denoting an object by using a label,
   determining to identify a variable denoting an object by using a description of the object.

7. A system for generating a mathematical word problem assessment item, the system comprising:
   a processor; and
   a computer-readable storage medium operably connected to the processor, wherein the computer-readable storage medium contains one or more programming instructions for causing the processor to execute steps comprising:
      receiving one or more word problem parameters from a user who provides input for generation of an assessment item via a graphical user interface, wherein the one or more word problem parameters are descriptive parameters upon which a content of the assessment item is based,
      identifying a plurality of number variables based on the one or more word problem parameters,
      determining a relationship between a first number variable and a second number variable,
      generating the assessment item comprising a mathematical word problem having multiple words using a processor including automatically generating a text phrase positioned between a first numerical value corresponding to the first variable and a second numerical value corresponding to the second number variable based on the one or more variables and the determined relationship;
wherein generating the text phrase comprises automatically resolving a context-dependent selection; and
storing the assessment item in a computer-readable memory;
wherein generating the text phrase comprises automatically choosing by the processor one or more of word order, word choice, word format, sentence structure, grammar and language of the text phrase based on the determined relationship.

8. A system for generating a mathematical word problem assessment item, the system comprising:
a processor; and
a computer-readable storage medium operably connected to the processor, wherein the computer-readable storage medium contains one or more programming instructions for causing the processor to execute steps comprising:
receiving one or more inputs pertaining to a format of an assessment item, wherein the format of the assessment item comprises at least one event,
receiving one or more word problem parameters from an assessor a user who provides input for generation of the assessment item via a graphical user interface, wherein the one or more word problem parameters are descriptive parameters upon which a content of the assessment item is based,
selecting one or more variables for use in the assessment item, wherein each variable is assigned to an event,
determining a relationship between variables assigned to an event,
determining the format for the assessment item, and
generating the assessment item comprising a mathematical word problem having multiple words including automatically generating a text phrase positioned between a first numerical value corresponding to a first variable and second numerical value corresponding to a second variable based on at least the format for the assessment item and the determined relationship between variables assigned to the at least one event;
wherein generating the text phrase comprises automatically resolving a context-dependent selection; and
storing the assessment item in a computer-readable memory;
wherein generating the text phrase comprises automatically choosing by the processor one or more of word order, word choice, word format, sentence structure, grammar and language of the text phrase based on the determined relationship.

9. A computer-implemented method of generating a mathematical word problem assessment item, the method comprising:
receiving one or more input parameters;
generating a document structure based on the one or more input parameters and a relationship between a first number variable and a second number variable identified by the one or more input parameters;
producing a logical schema from the document structure;
generating an assessment item comprising a mathematical word problem having multiple words including automatically generating a text phrase positioned between a first numerical value corresponding to the first number variable and a second numerical value corresponding to the second number variable based on the logical schema using a data processor;
wherein generating the text phrase comprises automatically resolving a context-dependent selection; and
storing the assessment item in a computer-readable memory;
wherein generating the text phrase comprises automatically choosing by the processor one or more of word order, word choice, word format, sentence structure, grammar and language of the text phrase based on the determined relationship.

10. The method of claim 9 wherein generating a document structure comprises:
building a mental model; and
outlining the document structure based on the mental model.

11. The method of claim 10 wherein building a mental model comprises:
selecting one or more semantic frames;
generating a list of one or more events; and
binding one or more variables across the one or more events.

12. The method of claim 10 wherein outlining the document structure comprises:
generating one or more sentences for the mental model;
determining a function for each sentence; and
determining information to express in each sentence.

13. The method of claim 9 wherein the document structure includes one or more of the following:
one or more variables;
one or more values for at least one of the variables;
a mental model structure; and
an outline of a sequence of one or more sentences for the assessment item.

14. The method of claim 9 wherein producing a logical schema comprises:
outlining a sentence structure for one or more sentences; and
determining an information format for each sentence.

15. The method of claim 14 wherein determining an information format comprises one or more of the following:
determining a verb type for each sentence;
determining an ordering of one or more elements for each sentence; and
determining one or more vocabulary sets to use for each element.

16. The method of claim 9 wherein generating an assessment item comprises:
parsing the logical schema;
annotating the parsed logical schema with grammatical information;
determining words and word forms based on the grammatical information; and
outputting text representing the assessment item.

17. A computer-implemented method of generating a mathematical word problem assessment item, the method comprising:
defining one or more semantic frames;
assigning one or more mental model structure variables;
defining one or more identity variables for a mental model structure;
determining a task-relevant problem structure;
defining a document format;
determining language variations including selecting a referent identification type for each of one or more participants based on a determined relationship between a first identity variable and a second identity variable using a data processor;
generating an assessment item comprising a mathematical word problem having multiple words including automatically generating a text phrase positioned between a first numerical value corresponding to the first identity variable and a second numerical value corresponding to the second identity variable based on the task-relevant problem structure, the document format and the language variations using a data processor;
wherein generating the text phrase comprises automatically resolving a context-dependent selection; and
storing the assessment item in a computer-readable memory;
wherein generating the text phrase comprises automatically choosing by the processor one or more of word order, word choice, word format, sentence structure, grammar and language of the text phrase based on the determined relationship.

18. The method of claim 17 wherein assigning one or more mental model structure variables comprises defining one or more of the following:
one or more events;
one or more participant types; and
an event type for each event.

19. The method of claim 18 wherein determining a task-relevant problem structure comprises:
determining a variable for which to solve for each event;
determining an answer for each event; and
determining one or more values for each variable.

20. A system for automatically generating a mathematical word problem assessment item, the system comprising:
a processor; and
a computer-readable storage medium operably connected to the processor, wherein the computer-readable storage medium contains one or more programming instructions for causing the processor to execute steps comprising:
receiving one or more input parameters,
generating a document structure based on the one or more input parameters and a relationship between a first number variable and a second number variable determined based on the one or more input parameters,
producing a logical schema from the document structure,
generating an assessment item comprising a mathematical word problem having multiple words including automatically generating a text phrase positioned between a first numerical value corresponding to the first number variable and second numerical value corresponding to the second number variable from the logical schema;
wherein generating the text phrase comprises automatically resolving a context-dependent selection; and
storing the assessment item in a computer-readable memory;
wherein generating the text phrase comprises automatically choosing by the processor one or more of word order, word choice, word format, sentence structure, grammar and language of the text phrase based on the determined relationship.

21. A system for automatically generating a mathematical word problem assessment item, the system comprising:
a processor; and
a computer-readable storage medium operably connected to the processor, wherein the computer-readable storage medium contains one or more programming instructions for causing the processor to execute steps comprising:
defining one or more semantic frames;
assigning one or more mental model structure variables,
defining one or more identity variables for a mental model structure,
determining a task-relevant problem structure,
defining a document format,
determining language variations including automatically generating a text phrase positioned between a first numerical value corresponding to a first identity variable and a second numerical value corresponding to a second identity variable and selecting a referent identification type for each of one or more participants based on a relationship between the first identity variable and the second identity variable using a data processor;
wherein generating the text phrase comprises automatically resolving a context-dependent selection;
generating an assessment item comprising a mathematical word problem having multiple words based on the task-relevant problem structure, the document format and the language variations; and
storing the assessment item in a computer-readable memory;
wherein generating the text phrase comprises automatically choosing by the processor one or more of word order, word choice, word format, sentence structure, grammar and language of the text phrase based on the determined relationship.

22. The method of claim 1, wherein the first numerical value is one of the identified variables;
wherein the second numerical value is one of the identified variables.

23. The method of claim 1, wherein the first numerical value or the second numerical value is a constant identified by the one or more word problem parameters.

24. The method of claim 1, wherein said context dependent selection includes at least one of a subject-verb agreement selection and an indefinite-definite article selection.

25. The method of claim 2, wherein said context-dependent selection includes at least one of a subject-verb agreement selection and an indefinite-definite article selection.

26. The system of claim 7, wherein said context-dependent selection includes at least one of a subject-verb agreement selection and an indefinite-definite article selection.

27. The system of claim 8, wherein said context-dependent selection includes at least one of a subject-verb agreement selection and an indefinite-definite article selection.

28. The method of claim 9, wherein said context-dependent selection includes at least one of a subject-verb agreement selection and an indefinite-definite article selection.

29. The method of claim 17, wherein said context-dependent selection includes at least one of a subject-verb agreement selection and an indefinite-definite article selection.

30. The system of claim 20, wherein said context-dependent selection includes at least one of a subject-verb agreement selection and an indefinite-definite article selection.

31. The system of claim 21, wherein said context-dependent selection includes at least one of a subject-verb agreement selection and an indefinite-definite article selection.

32. The method of claim 1, wherein specification of textual content for the assessment item is separated from details of wording of the assessment item.

* * * * *